United States Patent
Ohmura et al.

(10) Patent No.: US 7,319,114 B2
(45) Date of Patent: Jan. 15, 2008

(54) HOLLOW POLYMER PARTICLES, METHOD FOR PREPARING HOLLOW POLYMER PARTICLES, POROUS CERAMIC FILTER, AND METHOD FOR PREPARING POROUS CERAMIC FILTER

(75) Inventors: Takahiro Ohmura, Yamaguchi (JP); Yasushi Nakata, Osaka (JP); Yasuhiro Kawaguchi, Yamaguchi (JP); Takahiro Yoshida, Shiga (JP)

(73) Assignees: Sekisui Chemical Co., Ltd., Osaka (JP); Tokuyama Sekisui Co., Ltd., Osaka (JP)

( * ) Notice: Subject to any disclaimer, the term of this patent is extended or adjusted under 35 U.S.C. 154(b) by 0 days.

(21) Appl. No.: 10/471,502

(22) PCT Filed: Mar. 12, 2002

(86) PCT No.: PCT/JP02/02320

§ 371 (c)(1),
(2), (4) Date: Sep. 11, 2003

(87) PCT Pub. No.: WO02/072671

PCT Pub. Date: Sep. 19, 2002

(65) Prior Publication Data

US 2004/0091709 A1    May 13, 2004

(30) Foreign Application Priority Data

Mar. 14, 2001  (JP) ............................. 2001-072354

(51) Int. Cl.
C08J 9/28  (2006.01)
C08K 9/02  (2006.01)
B32B 5/16  (2006.01)

(52) U.S. Cl. ..................... 521/61; 428/308.4; 428/327; 428/402; 521/63; 521/64; 521/100; 521/108

(58) Field of Classification Search ................. 521/52, 521/53, 54, 55, 56, 1, 63, 64, 100, 106; 428/402, 428/327, 308.4; 264/41, 45.3, 46.5
See application file for complete search history.

(56) References Cited

U.S. PATENT DOCUMENTS

| | | | | |
|---|---|---|---|---|
| 2,996,389 A | * | 8/1961 | Fernhof | 501/82 |
| 3,615,972 A | * | 10/1971 | Morehouse et al. | 156/79 |
| 4,551,389 A | * | 11/1985 | Ohtake et al. | 428/402 |
| 4,698,317 A | * | 10/1987 | Inoue et al. | 501/9 |
| 4,777,153 A | * | 10/1988 | Sonuparlak et al. | 501/82 |
| 4,946,953 A | * | 8/1990 | Okuma et al. | 536/57 |
| 5,041,464 A | | 8/1991 | Hoshino et al. | |
| 5,578,217 A | * | 11/1996 | Unger et al. | 210/670 |
| 5,846,276 A | | 12/1998 | Nagai et al. | |
| 5,914,397 A | * | 6/1999 | Kiyose et al. | 536/71 |
| 5,994,418 A | * | 11/1999 | Weiser et al. | 521/56 |
| 6,479,099 B1 | | 11/2002 | Takahashi et al. | |

FOREIGN PATENT DOCUMENTS

| | | |
|---|---|---|
| JP | 36-9168 | 6/1961 |
| JP | 37-14327 | 9/1962 |
| JP | 56-32513 | 4/1981 |
| JP | 60-155245 A | 8/1985 |
| JP | 61-87734 A | 5/1986 |
| JP | 2-173101 | 7/1990 |
| JP | 2-255704 A | 10/1990 |
| JP | 02-290211 A | 11/1990 |
| JP | 5-125127 A | 5/1993 |
| JP | 5-40770 | 6/1993 |
| JP | 06-227874 A | 8/1994 |
| JP | 07-157672 A1 | 6/1995 |
| JP | 7-216127 A | 8/1995 |
| JP | 8-113654 A | 5/1996 |
| JP | 8-506850 A | 7/1996 |
| JP | 08-215522 A1 | 8/1996 |
| JP | 9-19635 | 1/1997 |
| JP | 10-244152 A | 9/1998 |
| JP | 2000-248005 A | 9/2000 |
| JP | 2000-288325 A | 10/2000 |
| JP | 2001-213727 | * 8/2001 |
| JP | 2001-213727 A | 8/2001 |
| JP | 2003-183087 | * 7/2003 |
| JP | 2001-123834 | * 4/2004 |
| JP | 2004-123834 | * 4/2004 |
| WO | WO 94/19162 A1 | 9/1994 |

* cited by examiner

Primary Examiner—H. T Le
(74) Attorney, Agent, or Firm—Frishauf, Holtz, Goodman & Chick, P.C.

(57) ABSTRACT

Hollow polymer particles are provided to have an average particle diameter of 15 μm or more and 500 μm or less and a 10%-compressive strength of 1.5 MPa or more, and the hollow polymer particle includes a hollow portion in the interior. In addition, a porous ceramic filter is provided by firing a shaped material composed of a mixture in which the above-described hollow polymer particles are mixed to disperse in a ceramic composition.

17 Claims, No Drawings

HOLLOW POLYMER PARTICLES, METHOD FOR PREPARING HOLLOW POLYMER PARTICLES, POROUS CERAMIC FILTER, AND METHOD FOR PREPARING POROUS CERAMIC FILTER

This application is the United States national phase application of International Application PCT/JP02/02320 filed Mar. 12, 2002.

TECHNICAL FIELD

The present invention is in particular aimed at manufacturing a porous ceramic filter, and relates to hollow polymer particles to be added as pore-forming agents to a ceramic composition, a method for manufacturing the hollow polymer particles, a porous ceramic filter prepared using the hollow polymer particles and a method for manufacturing a porous ceramic filter. Furthermore, the present invention relates to a material for a diesel particulate filter to prepare a filter built in an exhaust system in order to perform a cleaning treatment of an exhaust gas discharged from an engine, a combustion furnace, an incinerator or the like, and a method for-manufacturing the same.

BACKGROUND ART

In recent years, various porous honeycomb filters have been proposed as porous ceramic filters, wherein partitions of the honeycomb structure made of cordierite are allowed to have a porous structure, and the porous honeycomb filters are thereby made to have a function of filtrating fluids, e.g. gases, by passing the fluids through the partitions. Examples thereof in practical use include a filter for collecting fine particles in an exhaust gas discharged from a diesel car (diesel particulate filter).

In such a porous honeycomb filter, an average pore diameter (hereafter referred to as pore diameter) and a porosity of the porous material are very important factors for determining the performance of the filter. In particular, with respect to a porous ceramic filter, such as a diesel particulate filter, it is desired that the filter has a large pore diameter and a large porosity from the viewpoint of collection efficiency of fine particles, pressure drop and collection time.

The pore diameter is conventionally controlled by appropriately selecting a particle diameter of an aggregate in a ceramic composition to become a material for a filter. However, there are problems with the material cost and the productivity due to restrictions on aggregate particles.

As a method for controlling the pore diameter under no influence of the type of aggregate particle, for example, a method in which an organic macromolecule is added to a ceramic composition is proposed (Japanese Unexamined Patent Application Publication No. 2000-288325).

On the other hand, a pore-forming agent, e.g. graphite, is added to a ceramic composition in a common method for improving the porosity.

However, when large amounts of pore-forming agent is used in order to further improve the porosity, problems occur in that a firing time is extended, the number of steps is increased and, in addition, a strain is put on the filter due to an increase in the heat of combustion of the pore-forming agent, and cracks thereby occur in the filter.

That is, in the ceramic filter, reduction in thermal expansion and an improvement in thermal-shock resistance are important.

In order to reduce the heat of combustion, the inventors of the present invention considered the use of hollow polymer particles as pore-forming agents. However, problems occurred in that conventional hollow polymer particles were too small for use as the pore-forming agents, and that since hollow polymer particles prepared by foaming had insufficient particle strength, particles were broken due to mechanical shearing force during mixing or molding of the ceramic composition. Therefore, no hollow polymer particle was available with a particle diameter and strength suited for performing a function as a pore-forming agent.

That is, with respect to the method for manufacturing hollow polymer particles, a method is known, in which suspension polymerization or emulsion polymerization is performed in the presence of a water-insoluble organic solvent having a non-polymerization property and, thereby, polymer particles including the solvent in the interior pores are prepared as disclosed in, for example, Japanese Examined Patent Application Publication No. 36-9168 and Japanese Examined Patent Application Publication No. 37-14327.

However, in such a method, there are problems in that particles including a desired solvent may not be sufficiently prepared, the distributions of particle diameters and diameters of hollow portions (interior pores) become significantly large and the like. Consequently, satisfactory hollow polymer particles cannot be prepared even when these included materials are removed.

On the other hand, as a means for improving this, a method is disclosed in Japanese Examined Patent Application Publication No. 5-40770. In the method, a mixed solution prepared by dispersing a hydrophilic monomer, a cross-linkable monomer and an oily material is subjected to suspension polymerization or emulsion polymerization so as to prepare polymer particles including the oily material in the interior pore and, thereafter, the oily material is removed, so that hollow polymer particles are prepared.

However, in this method, even when the amount of a polymerization dispersing agent is controlled in order to prepare hollow polymer particles having an average particle diameter of 15 μm or more, suitable for a pore-forming agent, coagulation of the particles is brought about, and therefore, it is difficult to prepare desired particles.

In the case disclosed in Japanese Unexamined Patent Application Publication No. 9-19635 where a microcapsule encapsulating a volatile material, e.g. butane or pentane, is heated, and the volatile material is thereby gasified to expand so as to prepare foamed particles, since the thickness of a shell polymer layer becomes very small, no particle having satisfactory strength can be prepared.

Some methods are known, in which polymer particles including hollow portions are manufactured without using the above-described organic solvents.

That is, for example, Japanese Unexamined Patent Application Publication No. 56-32513 discloses a method for preparing particles. In the method, a basic material is applied to a polymer particle composed of a core portion having a swelling property by an alkali and a shell portion covering the core portion so as to swell and expand the core portion, and a hollow portion is thereby formed in the particle during drying. Japanese Unexamined Patent Application Publication No. 2-173101 discloses a method in which a core portion of a core/shell type polymer having the core portion composed of a vinyl acetate polymer is hydrolyzed, and the method is similar to that disclosed in Japanese Unexamined Patent Application Publication No. 56-32513.

However, with respect to these methods, since the shell portion must also have plasticity in order to expand the core portion, there are problems in that, for example, polymer particles having excellent strength and hollowing portions cannot be prepared with ease, and since water absorbed in the polymer of the core portion is not removed with ease, the drying property is poor when used for a predetermined purpose.

Consequently, it is desired to provide hollow polymer particles which can be used as pore-forming agents for the above-described ceramic composition and which have a predetermined value or more of strength and a proper particle diameter.

It is an object of the present invention to overcome the above-described problems and to provide hollow polymer particles which can be effectively used as pore-forming agents and which have a predetermined value or more of strength and a proper particle diameter, a method for manufacturing the same, a high-performance porous ceramic filter manufactured using the hollow polymer particles and a method for manufacturing the same.

DISCLOSURE OF INVENTION

In order to overcome the above-described problems, the inventors of the present invention conducted intensive research on hollow polymer particles which were able to achieve satisfactory results with respect to those various problems and on a method for manufacturing the same, and thereby found out that hollow polymer particles having a predetermined value or more of strength and a proper particle diameter were able to be prepared, the interior morphology of the hollow polymer particle did not become a single pore, but exhibited the shape of a honeycomb having a plurality of pores when a monomer having a not so strong hydrophilicity was used in the step of manufacturing a polymer to constitute the skeleton of the above-described hollow polymer particle, and a porous ceramic filter having further improved performances was able to be prepared by firing a shaped material composed of a mixture of the hollow polymer particles serving as pore-forming agents and a ceramic composition. Consequently, the present invention was made.

Hollow polymer particles according to the present invention which are hereafter referred to as "the hollow polymer particles of embodiment 1" are configured to have an average particle diameter of 15 µm or more and 500 µm or less and a 10%-compressive strength of 1.5 MPa or more, and the particle includes a hollow portion in the interior.

Hollow polymer particles according to the present invention which are hereafter referred to as "the hollow polymer particles of embodiment 2" are configured to have an average particles diameter of 20 µm or more and 300 µm or less and a 10%- compressive strength of 3.0 MPa or more, and the particle includes a hollow portion in the interior that the hollow polymer particles can be used as pore-forming agents for molding a porous ceramic filter.

Hollow polymer particles according to the present invention which are hereafter referred to as "the hollow polymer particles of embodiment 3" are the hollow polymer particles of embodiment 1 or embodiment 2, which a plurality of hollow portions are provided in the interior of the particle.

Hollow polymer particles according to the present invention which are hereafter referred to as "the hollow polymer particles of embodiment 4" are the hollow polymer particles of embodiment 3, in which the diameters of the hollow portions are less than or equal to 0.5 times the particle outer diameter.

The above-described diameter of the hollow portion represents an average diameter of the maximum diameter and the minimum diameter among diameters of hollow portions, and the above-described particle outer diameter represents an average of the maximum diameter and the minimum diameter among the particle outer diameters.

A method for manufacturing the hollow polymer particles according to the present invention which are hereafter referred to as "the method for manufacturing hollow polymer particles of embodiment 5" is to prepare the hollow polymer particles of any one of embodiment 1 to embodiment 4, and the method includes at least the step of suspending a monomer solution for polymerization in a polar solvent containing a colloidal inorganic dispersion stabilizer, the monomer solution being a mixture of at least 100 parts by weight of a monomer component for polymerization and 1 part by weight or more and 400 parts by weight or less of organic solvent having a non-polymerization property; and the monomer component being composed of 10% by weight or more and 99.9% by weight or less of hydrophilic monomer, 0.1% by weight or more and 30% by weight or less of multifunctional monomer and 0% by weight or more and 89.9% by weight or less of other monomers, followed by polymerizing the monomer component for polymerization so as to prepare polymer particles including the above-described organic solvent having a non-polymerization property, and the step of removing the organic solvent having a non-polymerization property from the resulting polymer particles.

A method for manufacturing the hollow polymer particles according to the present invention which is hereafter referred to as "the method for manufacturing hollow polymer particles of embodiment 6" is the method for manufacturing hollow polymer particles of embodiment 5, in which at least one of colloidal silica and calcium phosphate is used as the colloidal inorganic dispersion stabilizer.

A method for manufacturing hollow polymer particles according to the present invention which is hereafter referred to as "the method for manufacturing hollow polymer particles of embodiment 7" is the method for manufacturing hollow polymer particles of embodiment 6, in which the colloidal inorganic dispersion stabilizer is used at a ratio of 1 part by weight or more and 20 parts by weight or less relative to 100 parts by weight of the monomer solution for polymerization.

A porous ceramic filter according to the of the present invention which is hereafter referred to as "the filter of embodiment 8" is a fired shaped material composed of a mixture in which at least the hollow polymer particles of any one of embodiment 1 to embodiment 4 are mixed to disperse in a ceramic composition.

In a porous ceramic filter according to the present invention which is hereafter referred to as "the filter of embodiment 9", cordierite or a composition convertible to cordierite by firing is used as the ceramic composition.

A porous ceramic filter according to the present invention which is hereafter referred to as "the method for manufacturing a filter of embodiment 10" is configured to include the steps of dry-mixing at least the hollow polymer particles according to any one of embodiment 1 to embodiment 4, a ceramic composition and an organic binder, followed by kneading after a molding promoter is mixed, in a kneading step, extruding the ceramic composition resulting from the kneading step so as to form into a predetermined shape, in a shaping step, and subjecting the shaped material resulting from the shaping step to a degreasing step, followed by firing in a firing step.

The present invention will be described below in more details.

The hollow polymer particles of the present invention are controlled to have an average particle diameter of 15 μm or more and 500 μm or less and a 10%-compressive strength of 1.5 MPa or more, as in the hollow polymer particles of embodiment 1. This is because if the average particle diameter is less than 15 μm and the hollow polymer particles are used as pore-forming agents, the resulting porous ceramic shaped material has a reduced pore diameter, and a pressure drop is thereby increased which reduces a collection time in the use as a filter. On the other hand, if the average particle diameter exceeds 500 μm and the hollow polymer particles are used as pore-forming agents, the resulting porous ceramic shaped material has an excessively large pore diameter and, thereby, although a pressure drop is decreased, the collection efficiency is lowered in the use as a filter.

On the other hand, if the 10%-compressive strength is less than 1.5 MPa, the hollow polymer particles may be broken due to a mechanical shearing force in the stage of mixing with the ceramic composition and shaping into the predetermined shaped material.

When the hollow polymer particles of the present invention are used as pore-forming agents for porous ceramic filters, such as diesel particulate filters, more preferably, the average particle diameter is adjusted to be 20 μm or more and 300 μm or less and the 10%-compressive strength is adjusted to be 3.0 MPa or more, as in the hollow polymer particles of embodiment 2.

Preferably, the hollow polymer particle of the present invention exhibits the interior morphology including a plurality of hollow portions in the interior, as in the hollow polymer particles of embodiment 3. This is because partitions separating the hollow portions from each other in the interior of the particle perform a function as pillars when the above-described interior morphology is adopted, and the compressive strength is thereby increased.

The hollow polymer particles of the present invention are primarily used as pore-forming agents in the manufacture of the filters of embodiment 8 and embodiment 9 by the method for manufacturing a filter of embodiment 10. However, the hollow polymer particles can be applied to other purposes, for example, the particles are used as pore-forming agents in the manufacture of other porous ceramic shaped materials, such as hygroscopic boards and acoustic boards.

A method for manufacturing the hollow polymer particles of the present invention is not specifically limited. However, the method for manufacturing hollow polymer particles of embodiment 5 is effective.

That is, in the above-described polymerization step, although the polymerization method is essentially not specifically limited, preferably, a suspension polymerization method is used, as in the method for manufacturing hollow polymer particles of embodiment 5, because the particle diameters can be easily controlled, and particles including effective hollow portions are likely to be formed.

It is believed that the hydrophilic monomer constituting the monomer component for polymerization has an affinity for a polar solvent higher than that for an organic solvent and, therefore, is localized at the interfaces of suspended droplets of oil in the monomer solution for polymerization with respect to the method for manufacturing hollow polymer particles of embodiment 5. As a result, the outer wall of the particle is formed by the polymerization.

Consequently, although not specifically limited, the hydrophilic monomer preferably has a water solubility of 1% by weight or more. Examples thereof include, for example, methyl (meth)acrylate, (meth)acrylonitrile, (meth) acrylamide, (meth)acrylic acid, glycidyl (meth)acrylate, 2-hydroxyethyl methacrylate, 2-hydroxypropyl methacrylate, vinylpyridine, 2-acryloyloxyethyl phthalate, itaconic acid, fumaric acid and dimethylaminomethyl methacrylate, and more preferably, include methyl methacrylate, (meth) acrylic acid and 2-hydroxyethyl methacrylate. These can be used alone, or at least two thereof can be used in combination.

If the amount of the hydrophilic monomer is too small, the outer wall of the particle is not sufficiently formed, and the porosity of the particle is decreased. Consequently, the hydrophilic monomer is used preferably at a ratio of 10% by weight or more and 99.9% by weight or less, in the monomer component for polymerization, and more preferably, 30% by weight or more and 99.9% by weight or less.

The multifunctional monomer constituting the above-described monomer component for polymerization is added for the purpose of improving the compression-resistant strength of the particle. Although the type thereof is not specifically limited, examples thereof include, for example, di(meth)acrylates, tri(meth)acrylates, diallyl compounds, triallyl compounds and vinyl compounds, as described below. These can be used alone, or at least two thereof can be used in combination.

Examples of di(meth)acrylates include ethylene glycol di(meth)acrylate, diethylene glycol di(meth)acrylate, triethylene glycol di(meth)acrylate, 1,6-hexanediol di(meth)acrylate, trimethylolpropane di(meth)acrylate and the like.

Examples of tri(meth)acrylates include trimethylolpropane tri(meth)acrylate, ethylene oxide-modified trimethylolpropane tri(meth)acrylate, pentaerythritol tri(meth)acrylate and the like.

Examples of diallyl compounds or triallyl compounds include pentaerythritol tetra(meth)acrylate, dipentaerythritol hexa(meth)acrylate, diallyl phthalate, diallyl maleate, diallyl fumarate, diallyl succinate, triallyl isocyanurate and the like.

Examples of divinyl compounds include divinylbenzene, butadiene and the like.

When the usage of the multifunctional monomer is too small, the compression-resistant strength of the particle is not sufficient, and when too large, coagulation of particles occurs during polymerization. Therefore, the multifunctional monomer is used preferably at a ratio of 0.1% by weight or more and 30% by weight or less, in the monomer component for polymerization, and more preferably, 0.3% by weight or more and 5% by weight or less.

Other monomers constituting the above-described monomer component for polymerization are added for the purpose of improving the mechanical strength, the chemical resistance and the moldability, and the type thereof is not specifically limited. However, examples thereof include, for example, alkyl (meth)acrylates, e.g., ethyl (meth)acrylate, propyl (meth)acrylate, butyl (meth)acrylate, cumyl (meth) acrylate, cyclohexyl (meth)acrylate, myristyl (meth)acrylate, palmityl (meth)acrylate and stearyl (meth)acrylate; aromatic vinyl monomers, e.g., styrene, α-methylstyrene, p-methylstyrene and p-chlorostyrene; vinyl esters, e.g., vinyl acetate and vinyl propionate; halogen-containing monomers, e.g., vinyl chloride and vinylidene chloride; ethylene; propylene and butadiene. These can be used alone, or at least two thereof can be used in combination.

When the usage of the above-described monomer is too large, the hydrophilicity of the monomer component for polymerization is reduced, and the formation of the particle outer wall is thereby inhibited. Therefore, the monomer is used preferably at a ratio of 0% by weight or more and 89.9% by weight or less, in the monomer component for polymerization, and more preferably, 0% by weight or more and 69.9% by weight or less.

Preferably, the above-described organic solvent having a non-polymerization property is localized in the oil droplet central portions of suspended droplets of oil in the monomer solution for polymerization, and have a water solubility of 0.2% by weight or less so as to exhibit hydrophobicity. Although the type thereof is not specifically limited, examples thereof include butane, pentane, hexane, cyclohexane, toluene, xylene and the like. Butane, pentane, hexane and cyclohexane, which have high volatility, are more preferable.

When the amount of addition of the organic solvent having a non-polymerization property is too small, the porosity of the particle is decreased, and when too large, the porosity becomes excessively large so that the strength of the particle is reduced. Therefore, the organic solvent having a non-polymerization property is added preferably at a ratio of 1 part by weight or more and 400 parts by weight or less relative to 100 parts by weight of the monomer component for polymerization, and more preferably, 10 parts by weight or more and 200 parts by weight or less.

In the method for manufacturing hollow polymer particles of the present invention, a colloidal inorganic dispersion stabilizer is added when the above-described monomer solution is subjected to suspension polymerization in the polar solvent.

The colloidal inorganic dispersion stabilizer is effective in stably dispersing oil droplets of 15 μm or more and 500 μm or less of the monomer solution for polymerization during the polymerization, wherein the oil droplets contain a non-polar organic solvent, and are very likely to coagulate. This effect was not achieved through the use of a macromolecular dispersing agent, such as polyvinyl alcohol or cellulose, or an organic surfactant alone.

Examples of the above-described colloidal inorganic dispersion stabilizer include, for example, colloidal silica, calcium phosphate, magnesium hydroxide, aluminum hydroxide, ferric hydroxide, barium sulfate, calcium sulfate, sodium sulfate, calcium oxalate, calcium carbonate, barium carbonate and magnesium carbonate. These can be used alone, or at least two thereof can be used in combination. However, colloidal silica and calcium phosphate are suitable for use, as in the method for manufacturing hollow polymer particles of Claim 6.

If the usage of the colloidal inorganic dispersion stabilizer is too large or too small, the stability of the oil droplets of the monomer solution for polymerization is insufficient, and coagulation of particles occurs during polymerization. Therefore, the colloidal inorganic dispersion stabilizer is used preferably at a ratio of 0.1 parts by weight or more and 20 parts by weight or less, relative to 100 parts by weight of monomer solution for polymerization, and more preferably, 0.5 parts by weight or more and 10 parts by weight or less.

With respect to the above-described colloidal inorganic dispersion stabilizer, an auxiliary stabilizer can be used, and examples thereof include, for example, polyvinyl pyrrolidone, polyethylene oxide, polyethyleneimine, a condensation product of diethanolamine and an aliphatic dicarboxylic acid, a condensation product of urea and formaldehyde, polyvinyl alcohol and cellulose.

With respect to the polar solvent containing the above-described colloidal inorganic dispersion stabilizer, preferably, the pH is appropriately adjusted depending on the type of the colloidal inorganic dispersion stabilizer used in the polymerization. For example, when colloidal silica or the like is used, the environment is preferably adjusted to be acidic, and when calcium phosphate, magnesium hydroxide or the like is used, the environment is preferably adjusted to be alkaline.

The polar solvent used for the above-described suspension polymerization must be non-compatible with the above-described monomer solution for polymerization. Although the type thereof is not specifically limited, examples thereof include water, methanol, ethanol, dimethyl sulfoxide, dimethyl formamide and the like, and water is preferably used because of handling ease.

A polymerization initiator used for the above-described suspension polymerization is an oil-soluble compound which is compatible with the above-described monomer solution for polymerization and which generates a free radical. Examples thereof include, for example, organic peroxides, e.g., benzoyl peroxide, lauroyl peroxide, dibutyl peroxydicarbonate and α-cumyl peroxyneodecanoate; azo initiators, e.g., azobisisobutyronitrile, and redox initiators.

With respect to the above-described suspension polymerization, in order to prevent generation of new particles due to occurrence of polymerization at a place other than oil droplets of the monomer solution for polymerization, an inorganic salt and a water-soluble polymerization inhibitor may be added to the polar solvent. The inorganic salt dissolves into the polar solvent, and performs functions of reducing the solubility of the monomer component for polymerization in the polar solvent and suppressing polymerization in the polar solvent. Examples of inorganic salts include sodium chloride, calcium chloride, sodium carbonate and the like.

The water-soluble polymerization inhibitor is added for the purpose of suppressing polymerization in the polar solvent as well, and examples thereof include sodium sulfite, copper chloride, iron chloride, titanium chloride, hydroquinone and the like.

In the case where the water-soluble polymerization initiator is used, preferable examples of the method for manufacturing hollow polymer particles of the present invention may include a method in which a polar solvent, e.g. water, a colloidal inorganic dispersion stabilizer and, as necessary, an auxiliary stabilizer, a pH adjustor, a water-soluble polymerization inhibitor and the like are put in a container provided with an agitator, a thermometer and the like, an initiator is dissolved beforehand into a monomer component for polymerization, an organic solvent having a non-polymerization property or a monomer solution for polymerization prepared by mixing them, these are added to initially charged materials, agitation is performed for a predetermined time at a temperature where the initiator does not substantially operate, and subsequently, the temperature is raised to or higher than the temperature where the initiator operates, or a reducing agent is added, followed by agitating for a predetermined time, so that the polymerization is completed. The monomer component for polymerization and the organic solvent having a non-polymerization property may be added to the initially charged materials without being treated. However, preferably, these are finely dispersed beforehand in a dispersion medium, and the resulting mixture is added. Alternatively, these are added to the initially charged materials without being treated, and preferably, are finely dispersed in the system by the action of a mechanical agitating force.

Examples of methods for finely dispersing beforehand the monomer component for polymerization and the organic solvent having a non-polymerization property in a dispersion medium include a method using a mechanical dispersion apparatus, e.g. a homomixer or a biomixer, or an ultrasonic homogenizer.

The particle diameter of the hollow polymer particle resulting from polymerization depends on the oil droplet diameter of the monomer solution for polymerization finely dispersed in the dispersion medium and, therefore, can be easily controlled by the type and the amount of the dispersion stabilizer or the agitating force of the mechanical dispersion apparatus.

The setting of temperature of the reaction system in the method of the present invention is varied depending on the composition and the molecular weight of the monomer component for polymerization to be used, and the type and the amount of the initiator. However, the setting is usually performed within the range of 30° C. or more and 100° C. or less.

Various additives may be used during or after the polymerization with no problem. Examples of the above-described additives include a pH adjustor, an age resister, an antioxidant, a preservative and the like.

At the time when the polymerization is substantially completed, the used organic solvent having a non-polymerization property remains in a state of being included in the hollow portions (interior pores) of the polymer particles.

This included solvent can be removed as necessary by a method in which steam or a gas, e.g. nitrogen or air, is blown into a disperse system of the resulting polymer particles, a method in which the system is subjected to a vacuum state, or the like. Furthermore, the hollow polymer particles prepared by the manufacturing method of the present invention are dried, and can be subjected to use as a powder.

The porous ceramic filter of the present invention can be prepared by firing a ceramic composition containing at least the above-described hollow polymer particles of the present invention in order that the hollow polymer particles are burnt off, as described in Claim 8. As the ceramic composition, preferably, cordierite or a composition convertible to cordierite by firing is used, as described in Claim 9.

Since cordierite is a naturally occurring mineral inherently having a small thermal expansion coefficient and excellent thermal-shock resistance, research has been performed with respect to the composition convertible to cordierite by firing, and the composition suited for industrial synthesis has been made clear. That is, in general, such a composition corresponds to that having a blending composition of 42% by weight or more and 56% by weight or less of $SiO_2$, 30% by weight or more and 45% by weight or less of $Al_2O_3$ and 12% by weight or more and 16% by weight or less of MgO. With respect to the preparation of the composition convertible to cordierite by firing, the ceramic material is not specifically limited. For example, the preparation can be performed by mixing a talc powder component, e.g., talc and calcined talc, a silica powder typified by amorphous silica, kaolin, calcined kaolin, aluminum oxide, aluminum hydroxide and the like. The composition may contain cordierite.

In the manufacture of the porous ceramic filter of the present invention, if the amount of addition of the hollow polymer particles is too small in the mixture of the above-described cordierite or composition convertible to cordierite by firing, the hollow polymer particles and the organic binder, the pore-forming effect is small, and if too large, the strength of the ceramic shaped material after firing is reduced. However, in the case where the ceramic shaped material has a honeycomb structure, the strength may become high even when the amount of addition of the hollow polymer particles is large and, therefore, the amount of addition of the hollow polymer particles is not specifically limited.

In the manufacture of the porous ceramic filter of the present invention, the amount of addition of the organic binder is 1% by weight or more and 10% by weight or less in the mixture of the above-described cordierite or composition convertible to cordierite by firing, the hollow polymer particles and the organic binder, and preferably, is at a ratio of 3% by weight or more and 7% by weight or less. If too small, the binding function as a binder cannot be sufficiently performed, and if too large, there is a high possibility that the strength of the ceramic shaped material after firing is reduced.

Typical examples of organic binders include methyl cellulose. Examples of molding promoters include water, glycerin and the like. These are used alone or as a mixture of at least two thereof.

Although not specifically limited, the method for manufacturing a filter includes a kneading step in which, first, the above-described cordierite or composition convertible to cordierite by firing, the organic binder and the hollow polymer particles are dry-mixed, the resulting mixture is blended with a mixture of water and glycerin mixed at an appropriate ratio, followed by further mixing. A method for shaping the resulting mixture is not specifically limited. Examples thereof include, for example, a method in which the mixture after subjected to the above-described kneading is extruded with an outlet dice having a honeycomb shape, and this continuous shaped material is cut to a shaped material size, and a method in which shaping is performed by a press-molding method.

In general, the shaped material after subjected to the above-described shaping is dried, followed by firing. The firing step may be performed by way of a degreasing step (preliminary firing step) after the drying. The firing temperature varies depending on compositions of the ceramic compositions. In the case where cordierite or a composition convertible to cordierite by firing is used as the ceramic composition, preferably, the firing temperature is 1,380° C. or more and 1,440° C. or less.

BEST MODE FOR CARRYING OUT THE INVENTION

Examples of the present invention will be described below, although not limited to the following examples.

EXAMPLES 1 to 4

Hollow polymer particles were prepared following the steps below in accordance with the blending composition shown in Table 1. A monomer component for polymerization (hydrophilic monomer, other monomer, multifunctional monomer), an organic solvent, and azobisisobutyronitrile (abbreviated as "AIBN" in Table 1) as an initiator were mixed, followed by agitating and, therefore, a monomer solution for polymerization was prepared. Ion-exchanged water (50% by weight of the total usage) as a polar solvent and colloidal silica or calcium phosphate as a colloidal inorganic dispersion stabilizer were added, agitation was performed with a homogenizer and, therefore, a suspension was prepared. On the other hand, the remaining ion-exchanged water, sodium chloride as an inorganic salt for suppressing polymerization, sodium sulfite as a water-soluble polymerization inhibitor, hydrochloric acid or sodium hydroxide as a pH adjustor were put in a 20-liter polymerization device provided with an agitator, a jacket, a reflux condenser and a thermometer, and agitation was started. The interior of the polymerization device was depressurized so as to deoxidize the interior of the vessel and, thereafter, the pressure was returned to atmospheric pressure, so that the interior was brought into a nitrogen atmosphere. Subsequently, the above-described suspension was put in the polymerization vessel by one operation, the polymerization vessel was heated to 80° C. and, therefore, polymerization was started. The polymerization was terminated after 5 hours elapsed, aging was performed for 1 hour and, thereafter, the polymerization vessel was cooled to room temperature. The slurry was dehydrated and, therefore, the organic solvent was removed by vacuum drying, so that hollow polymer particles were prepared.

COMPARATIVE EXAMPLE 1

Manufacture of hollow polymer particles was attempted in a manner similar to that in Example 1, except that polyvinyl alcohol ("KURARAY POVAL L-8" manufactured by Kuraray Co., Ltd.) was used as the dispersing agent instead of the inorganic dispersion stabilizer at the blending composition shown in Table 1. However, as shown in Table 1, coagulation of particles occurred during polymerization, and taking out of hollow polymer particles as a powder was impossible.

COMPARATIVE EXAMPLE 2

Polymer particles were prepared in a manner similar to that in Example 1, except that 90 parts by weight of organic solvent having a non-polymerization property was added to 10 parts by weight of monomer component for polymerization, as shown in Table 1. Separation of the organic solvent was observed during the polymerization in this system.

COMPARATIVE EXAMPLE 3

Polymer particles were prepared in a manner similar to that in Example 1, except that no organic solvent having a non-polymerization property was added, and the blending ratio of the monomer component for polymerization was changed, as shown in Table 1.

With respect to each of the hollow polymer particles prepared in the above-described Examples 1 to 4 and Comparative examples 2 and 3, the particle interior morphology, the average particle diameter, the porosity and the 10%-compressive strength were examined, and the results thereof are collectively shown in Table 1.

The average particle diameter, the interior morphology, the (hollow portion diameter/particle outer diameter) ratio, the porosity and the 10%-compressive strength were evaluated as described below.

[Average Particle Diameter]

A volume average particle diameter was measured with a Laser Scattering Particle Size Distribution Analyzer LA-910 manufactured by Horiba, Ltd. Samples were randomly taken from three locations in the powder, and the average value thereof was used.

[Observation of Interior Morphology]

The equatorial cross section of the particle was cut into a thin film, and the interior morphology was observed with a transmission electron microscope.

[(Hollow Portion Diameter/Particle Outer Diameter) Ratio]

With respect to randomly selected 10 particles, the equatorial cross section of each particle was cut into a thin film, and was observed with a transmission electron microscope. The average value of the longest diameter and the shortest diameter of a maximum hollow portion of each particle was defined as a maximum hollow portion diameter. The average value of these maximum hollow portion diameters was determined, and this average value was divided by the average particle diameter measured by the above-described method as well and, therefore, the ratio was determined.

[Porosity]

The porosity was measured with a Porosimeter 2000 manufactured by AMCO Incorporated. The pressure of mercury intrusion was 2,000 kg/cm$^2$. A sample was taken from an arbitrary location, and 0.5 g thereof was used for the evaluation.

[10%-Compressive Strength]

The 10%-compressive strength of the particles was measured with a Micro Compression Testing Machine MCTM-500 manufactured by SHIMADZU CORPORATION.

As is clear from Table 1, hollow polymer particles can be prepared according to the manufacturing method of the present invention, the particle including multiple hollow portions in the interior and having excellent strength, a large particle diameter and a high porosity. It is clear that when the amount of addition of the organic solvent having a non-polymerization property is too large, as in Comparative example 2, the resulting polymer particle has no hollow portion in the interior, and has a low porosity.

EXAMPLES 5 TO 8

A composition convertible to cordierite by firing (SS-400 manufactured by Marusu Yuyaku Goshi Kaisha: $SiO_2$ 49.0±2.0, $Al_2O_3$ 35.0±2.0, MgO 13.0±1.0), an organic binder (methyl cellulose manufactured by Shin-Etsu Chemical Co., Ltd.: METOLOSE 65SH-4000) and hollow polymer particles as pore-forming agents prepared in Examples 1 to 4 were dry-mixed for 5 minutes at the composition ratio shown in Table 2 with a mixer (manufactured by Miyazaki Iron works: MHS-100) and, thereafter, predetermined amounts of water and glycerin appropriately mixed at the ratio shown in Table 2 were added as molding promoters while agitation is performed with the mixer, followed by agitation for 10 minutes. The resulting mixture was kneaded with a kneader (manufactured by Miyazaki Iron works: MP-30-1) and, therefore, a green body was prepared. However, with respect to preparation of the green body, if the kneading is in an insufficient state, mud-cracking occurs on the surface of the green body. Therefore, kneading and observation of the surface state were repeated multiple times so as to verify a sufficiency of kneading. Each batch of green body was molded with a vacuum extruder (manufactured by Miyazaki Iron works: FM-30-1), and a green body sample was taken with an outlet dice in the shape of a cylindrical column. The penetration as an index of hardness of the green body and the weight of the green body were measured and, thereby, the density (porosity) was calculated. This evaluation through the use of the green body sufficiently represents the characteristics of the ceramic shaped material after firing. A porous ceramic filter was prepared to have a cylindrical honeycomb structure through the use of a large mixer, kneader and vacuum molding machine other than the above-described laboratory device. The cylindrical honeycomb structure had a rib thickness: 430 µm, the number of cells: 16/cm², a diameter: 118 mm and a height: 152 mm. The honeycomb structure based on each batch was dried, followed by firing at a rate of temperature increase of 40° C./h, at a maximum temperature of 1,410° C., and for a retention time of 6 hours, so that a porous ceramic filter was prepared.

COMPARATIVE EXAMPLE 4

A green body sample and a porous ceramic filter were prepared in a manner similar to that in Examples 5 to 8, except that the solid polymer particles prepared in Comparative example 3 were used instead of the hollow polymer particles, as shown in Table 2.

COMPARATIVE EXAMPLE 5

A green body sample and a porous ceramic filter were prepared in a manner similar to that in Examples 5 to 8, except that particles expanded by heating expandable particles ("F-50" manufactured by Matsumoto Yushi-Seiyaku Co., Ltd.) at 170° C. for 1 minute were used as pore-forming agents.

[Penetration]

The penetration measurement (manufactured by Nihon Abura Shikenki Kogyo K. K.: Penetration tester AN-201) was performed using the green body samples prepared in Examples 5 to 8 and Comparative examples 4 and 5. The load was set at 200 g, and the penetration was determined based on the depth of penetration of a needle into the sample of green body in the period of 5 seconds. This measurement measures the hardness of the green body, and sufficiently corresponds to the characteristic of the ceramic after firing.

[Density]

Each of green body samples prepared in Examples 5 to 8 and Comparative examples 4 and 5 was cut to have a predetermined volume, and weight measurement of the resulting sample specimen was performed (gravimetric method). Subsequently, the weight was divided by the volume and, therefore, the density was calculated. Since the present experiments were performed while the weights were adjusted to be the same on a constituent of the composition basis, it was determined that the porosity was increased and the pore-forming effect was increased with a decrease in the density on a unit volume basis.

[Filter Thermal Expansion Coefficient]

The thermal expansion coefficients in the height direction (A axis) and in the cylinder diameter direction (B axis) were measured with TMA100 manufactured by Seiko Instruments Inc. The measurement temperature was adjusted at 40° C. to 800° C., and the rate of temperature increase was adjusted at 40° C./h.

As is clear from Table 2, when the porous ceramic filter is prepared through the use of the hollow polymer particles, as pore-forming agents, prepared by the manufacturing method of the present invention, the resulting porous ceramic filter has a small thermal expansion coefficient, a small strain, excellent thermal-shock resistance and a high porosity compared with those in the case where the solid particles and expandable particles are used.

INDUSTRIAL APPLICABILITY

As described above, the hollow polymer particles of the present invention have a particle diameter of 15 µm or more and 500 µm or less and a 10%-compressive strength of 1.5 MPa or more. Consequently, when the hollow polymer particles are used as pore-forming agents in the manufacture of ceramic porous materials, e.g., porous ceramic filters, the ceramic porous materials suitable for porous ceramic filters having high porosities and high thermal-shock resistance can be prepared.

The hollow polymer particles adjusted to be as that of embodiment 2 can be suitably used in particular as pore-forming agents in the manufacture of a diesel particulate filter. With respect to the hollow polymer particles adjusted to be as that of embodiment 3, partitions between hollow portions in the particle serve as pillars and, therefore, the compressive strength is further increased. Furthermore, with respect to the hollow polymer particles adjusted to be as that of embodiment 4, the thickness of the polymer surrounding the hollow portion can be adjusted to be a thickness capable of ensuring sufficient compressive strength. That is, the hollow polymer particles having a stable compressive strength can be prepared with a high yield.

The method for manufacturing hollow polymer particles of the present invention can efficiently prepare the above-described hollow polymer particles of the present invention.

That is, the particle diameter and the size of the hollow portion can be arbitrarily controlled.

In the method for manufacturing a porous ceramic filter of the present invention, a shaped material composed of a mixture of the ceramic composition and the hollow polymer particles of the present invention as pore-forming agents is fired. Consequently, with respect to the resulting porous ceramic filter, the porosity is improved, the thermal expansion is reduced and the thermal-shock resistance is improved, so that the filter can suppress an increase in pressure drop and effectively extend the collection time while a high collection efficiency of the filter is maintained. That is, organic particles as conventional pore-forming agents are replaced with the same weight of the hollow polymer particles and, thereby, the volume occupied by the pore-forming agents is increased, so that an improvement in the porosity can be achieved. When the organic particles are replaced with the same weight of the hollow polymer particles, the heat of combustion of the particles during firing is decreased, a strain put on the ceramic shaped material is reduced and, thereby, the thermal expansion is reduced and the thermal-shock resistance is improved. Since firing time can be shortened, the fuel cost required for firing is reduced, the productivity is improved and, as a result, the manufacturing cost of the filter can be reduced.

TABLE 1

| | | | Example 1 | Example 2 | Example 3 | Example 4 | Comparative example 1 | Comparative example 2 | Comparative example 3 |
|---|---|---|---|---|---|---|---|---|---|
| Polymerization composition | | | | | | | | | |
| Hydrophilic monomer | MMA | (Parts by weight) | 49 | 25 | 49 | 59.1 | 49 | 7 | 70 |
| | HEMA | (Parts by weight) | | 14.2 | | | | | |
| Other monomer | IBM | (Parts by weight) | 20.3 | 10 | 15.3 | | 20.3 | 2.7 | 29 |
| Multifunctional monomer | TMP | (Parts by weight) | | 0.8 | 0.9 | | | | |
| | DPE | (Parts by weight) | 0.7 | | 5.7 | | 0.7 | 0.3 | 1 |
| Organic solvent having non-polymerization property | Pentane | (Parts by weight) | 30 | 30 | 30 | 40 | 30 | 90 | |
| | Hexane | (Parts by weight) | | 20 | | | | | |
| Initiator | AIBN | (Parts by weight) | 0.25 | 0.25 | 0.25 | 0.25 | 0.25 | 0.25 | 0.25 |
| Dispersing agent | Colloidal silica *1 | (Parts by weight) | 30 | | 30 | 40 | | 30 | 30 |
| | Calcium phosphate *1 | (Parts by weight) | | 30 | | | | | |
| | PVA *2 | (Parts by weight) | | | | | 167 | | |
| | PVP | (Parts by weight) | 0.3 | 0.3 | 0.3 | 0.4 | | 0.3 | 0.3 |
| Additive | NaCl | (Parts by weight) | 20 | 20 | 20 | 20 | 20 | 20 | 20 |
| | NaNO$_2$ | (Parts by weight) | 0.05 | 0.05 | 0.05 | 0.05 | 0.05 | 0.05 | 0.05 |
| | Hydrochloric acid *3 | (Parts by weight) | 0.2 | | 0.2 | 0.2 | | 0.2 | 0.2 |
| | NaOH | (Parts by weight) | | 0.1 | | | | | |
| Ion-exchanged water | | (Parts by weight) | 209 | 209 | 209 | 201 | 71 | 209 | 209 |
| Evaluation | | | | | | | | | |
| Average particle diameter | | (μm) | 52.1 | 144 | 65.3 | 32.9 | Coagulation during polymerization | 24.5 | 45.6 |
| Particle interior morphology | | — | Multiple pores | Multiple pores | Multiple pores | Multiple pores | | No pore | No pore |
| (hollow portion diameter/Particle outer diameter) | | — | 0.04 | 0.24 | 0.04 | 0.09 | | — | — |
| Porosity | | (%) | 32.2 | 48.7 | 29.6 | 43.5 | | 4.5 | 2.5 |
| 10% Compressive strength | | (MPa) | 5.92 | 3.56 | 15.3 | 4.97 | | 24.2 | 33.5 |

MMA Methyl methacrylate
HEMA 2-Hydroxyethyl methacrylate
IBM Isobutyl methacrylate
TMP Trimethylolpropane triacrylate
DPE Dipentaerythritol hexaacrylate
PVA Polyvinyl alcohol
PVP Polyvinyl pyrrolidone
*1: 20 wt %-aqueous solution
*2: 3 wt %-aqueous solution
*3: 35 wt %-aqueous solution

TABLE 2

| | | | Example 5 | Example 6 | Example 7 | Example 8 | Comparative example 4 | Comparative example 5 |
|---|---|---|---|---|---|---|---|---|
| Composition | Cordierite | Type | SS-400 | SS-400 | SS-400 | SS-400 | SS-400 | SS-400 |
| | | weight (g) | 405.42 | 405.42 | 405.42 | 405.42 | 405.42 | 405.42 |
| | Pore-forming agent | Type | Example 1 | Example 2 | Example 3 | Example 4 | Comparative example 3 | Expandable particles |
| | | weight (g) | 60.81 | 60.81 | 60.81 | 60.81 | 60.81 | 60.81 |
| | Organic binder | Type | 65SH-4000 | 65SH-4000 | 65SH-4000 | 65SH-4000 | 65SH-4000 | 65SH-4000 |
| | | weight (g) | 20.28 | 20.28 | 20.28 | 20.28 | 20.28 | 20.28 |
| | Water | weight (g) | 101.34 | 101.34 | 101.34 | 101.34 | 101.34 | 101.34 |
| | Glycerin | weight (g) | 12.15 | 12.15 | 12.15 | 12.15 | 12.15 | 12.15 |
| Physical properties | Penetration | mm | 15.6 | 15.3 | 15 | 15.2 | 11.8 | 14 |
| | Density | g/cm$^3$ | 1.76 | 1.76 | 1.76 | 1.8 | 2.0 | 1.92 |
| | Filter thermal expansion coefficient (A axis/B axis) | (×10$^{-6}$/° C.) | 0.62/1.12 | 0.50/0.92 | 0.61/1.15 | 0.55/1.03 | 0.76/1.30 | 0.64/1.07 |

The invention claimed is:

1. A method for manufacturing a polymer particle used as a pore-forming agent for molding a porous ceramic filter comprising (a) suspending a monomer solution for polymerization in a polar solvent containing a colloidal inorganic dispersion stabilizer, the monomer solution being a mixture of at least 100 parts by weight of a monomer component for polymerization and 1 part by weight to 400 parts by weight of an organic solvent having a non-polymerization property, said organic solvent having a water solubility of 0.2% by weight or less to exhibit hydrophobicity, said monomer component comprising 10% by weight or more and 99.9% by weight or less of a hydrophilic monomer, 0.1% by weight or more and 30% by weight or less of a multifunctional monomer and 0% by weight or more and 89.9% by weight or less of other monomers;

(b) polymerizing the monomer component for polymerization to prepare a polymer particle including a plurality of hollow portions, wherein the organic solvent having a non-polymerization property is contained in the interior of the hollow portions; and (c) removing the organic solvent having a non-polymerization property from the resulting polymer particle from step (b).

2. The method according to claim 1, wherein the colloidal inorganic dispersion stabilizer comprises at least one of colloidal silica and calcium phosphate.

3. The method according to claim 2, wherein the colloidal inorganic dispersion stabilizer is in an amount of 1 part by weight to 20 parts by weight relative to 100 parts by weight of the monomer solution for polymerization.

4. The method according to claim 1, wherein the colloidal inorganic dispersion stabilizer is in an amount of 1 part by weight to 20 parts by weight relative to 100 parts by weight of the monomer solution for polymerization.

5. The method according to claim 1, wherein the organic polymer is removed by applying a vacuum.

6. The method according to claim 1, wherein the organic polymer is removed by vacuum drying.

7. The method according to claim 1, wherein the organic polymer is removed by blowing nitrogen or air into a dispersed system of the polymer particle.

8. A polymer particle used as a pore-forming agent for molding a porous ceramic filter produced by the method of claim 1, the polymer particle having an average particle diameter of 15 µm to 500 µm and a 10%-compressive strength of 1.5 MPa or more, said polymer particle comprising a plurality of hollow portions in the interior thereof.

9. The polymer particle used as a pore-forming agent for molding a porous ceramic filter according to claim 8, said polymer particle having an average particle diameter of 20 µm to 300 µm and a 10%-compressive strength of 3.0 MPa or more.

10. The polymer particle according to claim 8 or claim 9, wherein the diameters of the hollow portions are less than or equal to 0.5 times the particle outer diameter.

11. A porous ceramic filter comprising a fired shaped-material comprising a mixture in which a plurality of the polymer particles according to claim 10 are mixed to disperse in a ceramic composition.

12. The porous ceramic filter according to claim 11, wherein the ceramic composition comprises cordierite or a composition convertible to cordierite by firing.

13. A method for manufacturing a porous ceramic filter comprising (a) dry-mixing a plurality of the polymer particles according to claim 10, a ceramic composition and an organic binder to form a mixture, (b) mixing a molding promoter into the mixture from step (a), (c) kneading the resultant mixture from step (b) to form a ceramic composition, (d) vacuum-extruding the ceramic composition from step (b) to form said composition into a shape of a filter, (e) subjecting the composition in a shape of a filter from step (d) to a degreasing step, and (e) firing the resultant degreased shaped composition in a shape of a filter from step (d).

14. A porous ceramic filter comprising a fired shaped-material comprising a mixture to which a plurality of the polymer particles according to claim 8 or claim 9 are mixed to disperse in a ceramic composition.

15. The porous ceramic filter according to 14 wherein the ceramic composition comprises cordierite or a composition convertible to cordierite by firing.

16. A method for manufacturing a porous ceramic filter comprising (a) dry-mixing a plurality of the polymer particles according to claim 8 or claim 9 a ceramic composition and an organic binder to form a mixture, (b) mixing a molding promoter into the mixture from step (a), (c) kneading the resultant mixture from step (b) to form a ceramic composition, (d) vacuum-extruding the ceramic composition from step (b) to form said composition into a shape of a filter, (e) subjecting the composition in a shape of a filter from step (d) to a degreasing step, and (e) firing the resultant degreased shaped composition in a shape of a filter from step (d).

17. The polymer particle according to claim 8, wherein the polymer particle does not contain an organic solvent having a non-polymerization property.

* * * * *